(12) United States Patent
Kurachi

(10) Patent No.: US 8,470,232 B2
(45) Date of Patent: Jun. 25, 2013

(54) ANNULAR BELT MADE OF POLYIMIDE AND A PRODUCTION METHOD THEREOF

(75) Inventor: Yasuo Kurachi, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 159 days.

(21) Appl. No.: 13/018,600

(22) Filed: Feb. 1, 2011

(65) Prior Publication Data

US 2011/0196124 A1    Aug. 11, 2011

(30) Foreign Application Priority Data

Feb. 8, 2010   (JP) .................................. 2010-25523

(51) Int. Cl.
*B28B 3/00* (2006.01)
*B28B 7/00* (2006.01)

(52) U.S. Cl.
USPC ..................... 264/319; 156/304.1; 156/304.3; 156/304.4; 264/204; 264/209.1; 264/209.6; 264/212; 264/299

(58) Field of Classification Search
USPC ................. 156/304.1, 304.3, 304.4; 264/204, 264/209.1, 209.6, 212, 299, 319
See application file for complete search history.

(56) References Cited

U.S. PATENT DOCUMENTS

| 6,139,784 | A | 10/2000 | Oshima et al. | |
| 2010/0279045 | A1* | 11/2010 | Nakajima et al. | 428/36.9 |

FOREIGN PATENT DOCUMENTS

JP    5-77252    3/1993

* cited by examiner

*Primary Examiner* — Ana Woodward
(74) *Attorney, Agent, or Firm* — Lucas & Mercanti, LLP

(57) ABSTRACT

The present invention relates to a method for producing an annular belt made of polyimide comprising;
  a) joining both ends of a sheet made of a polyimide precursor to form an annular belt; and
  b) performing an imidizing reaction of the polyimide precursor.

12 Claims, 2 Drawing Sheets

ANNULAR BELT MADE OF POLYIMIDE AND A PRODUCTION METHOD THEREOF

This application is based on Japanese application(s) No. 2010-25523 filed on Feb. 8, 2010, the contents of which are hereby incorporated by reference.

BACKGROUND OF THE INVENTION

1. Field of the Invention

The present invention relates to an annular belt made of polyimide and a production method thereof. The present invention relates, in particular, to an annular belt made of polyimide which is useful as a belt for electrophotography such as a transfer belt and a fixing belt, and a production method thereof.

2. Description of the Related Art

Polyimide has generally been used in various fields since it has excellent heat resistance properties, anti-electrostatic properties, mechanical properties and the like. For example, a polyimide belt is used as a transfer belt for transferring a toner image to an image receiving medium (paper, cardboard, OHP sheet and so on) or a fixing belt for fixing a toner image to an image receiving medium in an electrophotographic image-forming apparatus such as a laser printer, an electrophotographic copying machine and the like.

The polyimide belt is mainly provided in a form of an annular belt. Since it is necessary to obtain uniform physical properties of the belt which exert influence on image qualities, the annular belt made of polyimide is generally produced by a so-called centrifugal molding method in which a cast method using a solvent is applied. In Japanese Patent Publication (KOKAI) No. 1993-77252, for example, it is proposed that a seamless belt is produced by using the centrifugal molding method in order to achieve an uniform resistance of an intermediate transfer belt. With respect to the annular belt made of polyimide for electrophotography, a sufficient improvement of the said belt cannot be achieved by methods other than the centrifugal molding method. Because a film applied to a mold is so soft until a solvent is evaporated that sagging of the applied film occurs and a dried film thickness becomes ununiform, the centrifugal molding method wherein a cylindrical mold rotates must be used in order to prevent such problems. When the film thickness becomes ununiform in a circumferential direction, nonuniformity of electrostatic properties occurs, and the image qualities are influenced by the nonuniformity.

BRIEF SUMMARY OF THE INVENTION

However, when the centrifugal molding method is used, the problem of the nonuniformity caused by the influences of a gravitation force and an ambient temperature occurs, said influences not occurring in the case where a flat plate or a film is produced by the cast method. Therefore the mold must be rotated until the solvent is evaporated and the film becomes undeformable, so that the productivity of the annular belt becomes worse. Moreover, it is impossible to avoid a slight sagging of the applied film which occurs when the film is applied to the cylindrical mold and a slight vibration which occurs during a rotation of the mold. So the problems of the nonuniformity regarding to a film thickness and a surface roughness of the applied film could not sufficiently be solved.

An object of the present invention is to provide an annular belt made of polyimide having an excellent productivity as well as a sufficient uniformity regarding a film thickness, a surface roughness and the like, and a production method of said annular belt.

The present invention relates to a method for producing an annular belt made of polyimide comprising;
a) joining both ends of a sheet made of a polyimide precursor to form an annular belt; and
b) performing an imidizing reaction of the polyimide precursor,
and the annular belt made of polyimide produced by the method.

DETAILED DESCRIPTION OF THE INVENTION

Figure 1:
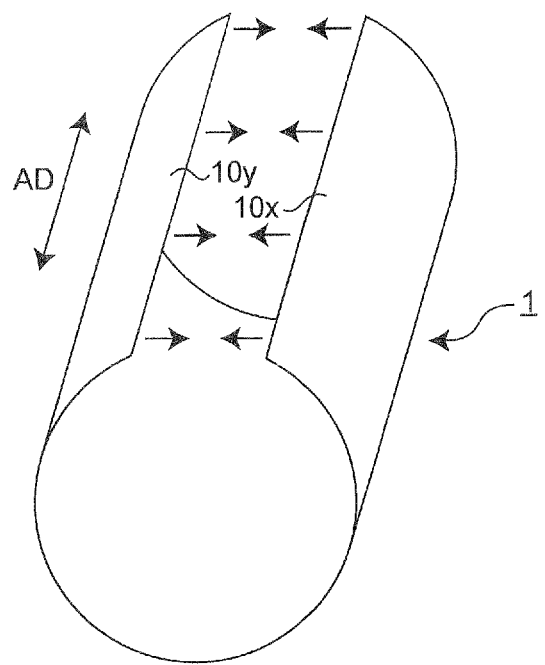
FIG. 1 is a schematic perspective view wherein the joining of both ends of a sheet is performed.

A method for producing an annular belt made of polyimide according to the present invention is a method for producing an annular belt comprising a condensation-type polyimide comprising;
a) molding a polyimide precursor which is an intermediate of a polyimide to a sheet;
b) processing the sheet to an annular belt; and
c) performing an imidizing reaction of the polyimide precursor.

Sheet Made of Polyimide Precursor

A sheet made of polyimide precursor (which is often referred to as "sheet", hereafter) is a flexible flat sheet comprising a thermoplastic polymer called as a so-called polyamic acid or polyamide acid which is an intermediate of polyimide.

A polyimide precursor for forming the sheet is a polyimide precursor obtained by a polymerization of a tetracarboxylic acid component and a diamine component, and is preferably an aromatic polyimide precursor obtained by a polymerization of an aromatic tetracarboxylic acid component and an aromatic diamine component.

Examples of the aromatic tetracarboxylic acid component include an aromatic tetracarboxylic acid; anhydrides, salts and esterified compounds thereof; and mixtures of these. In particular, the dianhydride of aromatic tetracarboxylic acid is preferably used. Specific examples of the aromatic tetracarboxylic acid include; biphenyltetracarboxylic acid compounds such as 3,3',4,4'-biphenyltetracarboxylic acid, 2,2',3,3'-biphenyltetracarboxylic acid and 2,3,3',4'-biphenyltetracarboxylic acid; benzophenonetetracarboxylic acid compounds such as 3,3',4,4'-benzophenonetetracarboxylic acid; diphenylalkanetetracarboxylic acid compounds such as bis(3,4-dicalboxyphenyl)methane and 2,2-bis(3,4-dicalboxyphenyl)propane; diphenyl ether tetracarboxylic acid compounds such as bis(3,4-dicarboxyphenyl)ether and bis(3,4-dicarboxyphenyl)thioether; diphenylsulfone tetracarboxylic acid compounds such as bis(3,4-dicarboxyphenyl)sulfone; naphthalenetetracarboxylic acid compounds such as 2,3,6,7-naphthalene tetracarboxylic acid; tetracarboxybenzene compounds such as pyromellitic acid and so on.

Examples of a component for forming salts with the aromatic tetracarboxylic acid include ammonia, organic monoamine, organic diamine, organic triamine and organic tetraamine, and, in particular, the aromatic diamine described below is preferably used.

Examples of a component for forming esterified compounds with the aromatic tetracarboxylic acid include monovalent alcohol, bivalent alcohol and trivalent alcohol.

Examples of a preferable component among the aromatic tetracarboxylic acid component include dianhydrides and esterified compounds of biphenyltetracarboxylic acid compounds and tetracarboxybenzene compounds and, in particular, dianhydrides of tetracarboxybenzene compounds are preferably used.

The other tetracarboxylic acid component may be comprised with the aromatic tetracarboxylic acid component. Examples of the other tetracarboxylic acid component includes aliphatic tetracarboxylic acid component such as butane tetracarboxylic acid and the like.

A content of the other tetracarboxylic acid is normally 80 mol % or less relative to the aromatic tetracarboxylic acid component.

Examples of the aromatic diamine component include; diaminodiphenyl ether compounds such as 4,4'-diaminodiphenyl ether (which is often abbreviated to "DADE", hereafter); diaminodiphenylalkane compounds such as 4,4'-diaminodiphenylmethane, 4,4'-diaminodiphenylpropane, 3,3'-diaminodiphenylmethane and 3,3'-diaminodiphenylpropane; benzidine compounds such as benzidine and 3,3'-dimethylbenzidine; diaminodiphenyl sulfide compounds such as 4,4'-diaminodiphenyl sulfide and 3,3'-diaminodiphenyl sulfide; diaminodiphenyl sulfone compounds such as 4,4'-diaminodiphenyl sulfone and 3,3'-diaminodiphenyl sulfone; and diaminobenzene compounds such as metha-phenylenediamine and para-phenylenediamine (PPD).

Examples of a preferable component among the aromatic diamine component include diaminodiphenyl ether compounds and diaminodiphenylalkane compounds.

The polyimide precursor for forming the sheet has a number-average molecular weight of, normally 1,000 or more, particularly 2,000 to 200,000, preferably 2,000 to 20,000. If the molecular weight is too low, a breaking strength of the sheet is lowered, and a molding of the annular belt described hereafter becomes difficult.

In the present specification, the number-average molecular weight is the value measured by using a GPC (made by Tosoh Corporation).

A thickness of the sheet made of the polyimide precursor is not particularly limited, and is normally 5 μm to 500 μm, preferably 10 μm to 300 μm.

A content of the solvent in the sheet made of the polyimide precursor is within the range of from 0.1 wt % to less than 8.0 wt %, preferably 0.1 to 5 wt %, more preferably 0.5 to 3 wt % relative to the total weight of the sheet. If the content of solvent is too low, the joining of both ends of the sheet is not sufficiently achieved in the molding step of the annular belt and the imidizing reaction step which are described hereafter, so that the obtained annular belt does not have desired stiffness properties, in particular, a tensile strength. If the content of solvent is too high, a breaking strength of the sheet is lowered, and a handling of a single sheet and a molding of the annular belt described hereafter become difficult.

The content of solvent of the sheet is the value measured by the following method. Firstly, a sample is cut off from the sheet and its weight (x; mg) is measured. Next, the sample is hold in an oven at 250° C. for 5 hours to sufficiently dry the sample. The sample is then left to be cooled and its weight (y; mg) is measured. Finally, the content of solvent is calculated according to the following equation.

$$\text{Content of solvent (wt \%)}=[(x-y)/x]\times100$$

The sheet which satisfies the content of solvent mentioned above has a breaking strength of 5 kg/cm² or more, preferably 10 kg/cm² or more, more preferably 100 kg/cm² or more. By using said sheet, it is possible to perform the molding step before the step of imidizing reaction, so that it is possible to produce an annular belt made of polyimide having a sufficient uniformity regarding a film thickness and a surface roughness in an excellent productivity.

The breaking strength of the sheet is the value measured by using an Autograph (made by Shimadzu Corporation).

Production Method of a Sheet Made of Polyimide Precursor

A sheet made of polyimide precursor can be produced by a casting method or an extrusion molding method. Specifically, a polymerization of a tetracarboxylic acid component and a diamine component is firstly performed to produce a polyimide precursor (polymerization step). Then, a sheet is produced by using a solution of the polyimide precursor in the casting method (sheet-producing step by casting method) or by using a gel of the polyimide precursor in the extrusion molding method (sheet-producing step by extrusion molding method).

Polymerization Step

The polymerization of the tetracarboxylic acid component and the diamine component can be performed in a good solvent for the polyimide precursor. The good solvent for the polyimide precursor is a solvent in which the polyimide precursor formed from the tetracarboxylic acid component and the diamine component mentioned above can uniformly be dissolved in a concentration of 20 wt % or more at 25° C. Examples of such a good solvent include an organic polar solvent selected from the group consisting of amides such as N,N-dimethylacetamide, N,N-diethylacetamide, N,N-dimethylformamide N,N-diethylformamide N-methyl-2-pyrrolidone and hexamethylsulforamide; sulfoxides such as dimethyl sulfoxide and diethyl sulfoxide; sulfones such as dimethyl sulfone and diethyl sulfone. These solvents may be used alone or in combination. N-methylpyrrolidone is preferably used.

Amounts of the tetracarboxylic acid component and the diamine component in the good solvent may be such amounts that a dissolved amount (a concentration of solid content) of the polyimide precursor in the solution of the polyimide precursor obtained after the polymerization is within the range which will be described hereafter.

A method for polymerizing the tetracarboxylic acid component and the diamine component in the good solvent for the polyimide precursor may be carried out by publicly known methods. Specifically, for example, when the tetracarboxylic acid component and the diamine component are used in equimolar amounts, and the polymerization is performed for 0.1 to 60 hours at a temperature of 100° C. or less, preferably 0 to 80° C. in the good solvent mentioned above, a solution of the polyimide precursor is obtained, wherein the polyimide precursor is uniformly dissolved in the good solvent in an amount of 2 to 50 wt %.

Sheet-Producing Step by Casting Method

A casting method is a publicly known method for obtaining a polymer sheet by using a polymer solution. In the present invention, a sheet can be obtained on the basis of the casting method. Examples of the casting method include i) a flow-casting method in which the solution of the polyimide precursor obtained by the above-mentioned polymerization is flow-casted on a substrate to evaporate a solvent and ii) pour-casting method in which the solution of the polyimide precursor is poured into a mold to evaporate a solvent.

A viscosity of the solution of the polyimide precursor, which is used in the casting method is not particularly limited as long as the sheet having the above-mentioned thickness can be obtained, and the viscosity may be, for example, 10 cp to 10,000 cp The solution of the polyimide precursor can be diluted by using a solvent in order to adjust the viscosity. The good solvent mentioned above and a poor solvent which will be mentioned below can be used as a solvent for dilution.

In particular, from the view point of accelerating a speed of film-formation speed and enhancing a production efficiency, the solution of the polyimide precursor used in the casting method preferably comprises the poor solvent. The poor solvent is a solvent in which the polyimide precursor can not be dissolved in a concentration of 2 wt % or more, particularly 1 wt % or more at 25° C. Examples of such a poor solvent include water; alcohols such as methanol, ethanol, isopropanol and the like; ethylene glycol; quinoline; isoquinoline; No. 0 Solvent; 1-decanol and the like. No. 0 Solvent is a n-paraffinic solvent which is obtained by purifying a kerosine fraction. These solvents may be used alone or in combination. It is preferable to use the poor solvent which is compatible with the good solvent for the polyimide precursor. It is more preferable to use the poor solvent having a boiling point which is higher than that of the good solvent for the polyimide precursor. Concretely, the poor solvent having a boiling point or a heat decomposition point of 150 to 500° C., preferably 170 to 300° C. is used.

An adding amount of the poor solvent is preferably within the range of 0.01 to 40 wt %, more preferably 0.1 to 20 wt % relative to an amount of the good solvent in the solution of the polyimide precursor.

Additives such as a conductive agent, a surfactant, a viscosity modifier, a plasticizer, a filler and the like may be added to the solution of the polyimide precursor.

The conductive agent may be a substance which can be dissolved in the solution of the polyimide precursor or a substance which is dispersed in said solution without being dissolved. The conductive agent is preferably a substance which is dispersed in a form of fine particles or fibers without being dissolved. The conductive agent which can be dispersed in the solution includes; powder and short fibers of carbon black; carbon nanotube; powder obtained by pulverizing graphite; short fibers of titanate; metal oxide powder such as Sb-doped tin oxide, In-doped tin oxide and zinc oxide; powder of electronically conductive polymer such as polyaniline, polypyrrole and polyacetylene; and so on. Specific examples of carbon black include acetylene black, Ketchen black, acidic carbon and the like.

A content of the conductive agent, in particular carbon black, is normally 1 to 65 wt % relative to an amount of the polyimide precursor.

When an annular belt made of polyimide is used as a transfer system belt for an electrophotographic system, such as an intermediate transfer belt, the belt must be a semiconductor having a comparatively high resistance of $10^6$ Ωcm or more as a volume specific resistance, so that the content of the conductive agent, in particular carbon black, is preferably 1.0 to 35 wt %, more preferably 3 to 15 wt % relative to an amount of the polyimide precursor.

When an annular belt made of polyimide is used as a fixing belt for an electrophotographic system, the belt must be a semiconductor having a comparatively low resistance of $10^2$ Ωcm or less as a volume specific resistance, so that the content of the conductive agent, in particular carbon nanotube or graphite powder, is preferably 10 to 65 wt %, more preferably 15 to 50 wt % relative to an amount of the polyimide precursor.

As the additives such as the surfactant and the viscosity modifier, the substances described in the following literatures can be used: Latest Polyimide—base and application—(edited by Japanese Society for Study of Polyimide (NTS Publisher)); Latest Polyimide Materials and Applied Technology (supervised by Masaaki Kakimoto; CMC Publisher).

When the additives which are not dissolved in the solution of the polyimide precursor are added to said solution, a means for achieving a uniform dispersion is preferably applied to the solution of the polyimide precursor. For example, publicly known mixers such as stirring blades, static mixer, single-screw kneader, double-screw kneader, homogenizer, ultrasonic dispersion machine and the like are preferably used for mixing and dispersing said additives into said solution.

A content of the solvent in the solution of the polyimide precursor which is used in the casting method is normally within the range of from 20 to 90 wt %, preferably 40 to 70 wt % relative to the total weight of the solution.

The content of the solvent in the solution is the value measured by the same method as in the case for measuring a content of the solvent contained in the sheet except that a part of the solution is used as a sample.

When a sheet is formed from the solution in the casting method, a film-forming means such as bar coater, doctor blade, slide hopper, spray coat, T-die extruder and the like may be used.

A drying method for evaporating the solvent in the casting method is not particularly limited, and, for example, a method for heating the substrate on which the solution is casted or the mold in which the solution is poured can be used. In this drying method, a heating member having a roll shape or a board shape or a wind, which is heated to the same temperature as that of the substrate and mold, may be used in order to accelerate the evaporation of the solvent.

A drying temperature (heating temperature) is not particularly limited as long as said temperature is lower than a starting temperature of imidizing reaction mentioned below, and the solvent can be evaporated at said temperature. For example, the drying temperature is within the range of from 40° C. to less than 280° C., in particular 80 to 260° C., preferably 120 to 240° C., more preferably 120 to 220° C.

In the casting method, the drying process may be performed until the content of the solvent contained in the dried sheet becomes a value within the above-mentioned range.

In the casting method, the substrate and the mold preferably have surfaces which contact with the solution of the polyimide precursor, said surfaces being subjected to a mirror finish process. Usually the substrate and mold having a surface roughness (Rz) of 10 to 3000 nm are employed.

Sheet-Producing Step by Extrusion Molding Method

An extrusion molding method is a publicly known method in which a polymer is extruded from a die to obtain a polymeric molded product. According to the present invention, a sheet can be obtained on the basis of such an extrusion molding method in present invention. In detail, there is a method in which the solution of the polyimide precursor obtained by the polymerization step mentioned above is dried to form a gel, and the polyimide precursor gel is extruded from a T-die onto the substrate to evaporate a solvent.

The solution of the polyimide precursor used in the extrusion molding method preferably comprises the same poor solvent as that contained in the solution of the polyimide precursor used in the casting method. An adding amount of the poor solvent is within the same range as that specified in the casting method.

Additives such as a conductive agent, a surfactant, a viscosity modifier, and the like may be added to the solution of the polyimide precursor. Kinds and amounts of these additives are same as those specified in the casting method.

A content of the solvent in the solution of the polyimide precursor used in the extrusion molding method is not particularly limited.

A drying process for forming the gel is performed by evaporating the solvent from the solution of the polyimide precursor. Examples of a drying method include i) a method in which the solution of the polyimide precursor is casted or applied to a heated drum made of metal to evaporate the solvent, and ii) a method in which the solution of the polyimide precursor is poured into a container made of metal, and said container is heated in water bath or oil bath to evaporate the solvent. In the case where either of these methods is used, a drying temperature is not particularly limited as long as said temperature is lower than a starting temperature of imidizing reaction mentioned below, and the solvent can be evaporated at said temperature. For example, the drying temperature may be within the same range as that specified in the casting method.

The drying process for forming the gel may be performed until the content of the solvent contained in the dried gel becomes a value within the range which will be mentioned below.

A content of the solvent in the polyimide precursor gel is within the range of from 8.0 wt % to less than 20 wt %, preferably 8.0 to 10 wt % relative to the total weight of the gel.

The content of the solvent contained in the gel is the value measured by the same method as in the case for measuring the content of the solvent contained in the sheet except that a part of the gel is used as a sample.

The gel which satisfies the above-mentioned content of the solvent has a comparatively high shape-retentive property, so that a sheet can easily be formed from said gel by the extrusion molding method in which a T-die is used.

The extrusion molding method is not particularly limited, and, for example, said method may be performed by using a commercially available single or double-screw extruder equipped with a so-called T-die on its discharge port. A temperature of the gel during the extrusion molding is not particularly limited as long as said temperature is lower than the starting temperature of imidizing reaction mentioned below. The gel temperature may preferably be within the range of from 10 to 100° C., particularly a room temperature from the view point of a production cost.

When a sheet is formed from the gel by the extrusion molding method, a film-forming means such as extrusion coater, roll coater and the like may be used.

A drying method for evaporating the solvent in the extrusion molding method is not particularly limited and, for example, a method of heating the substrate on which the gel is extruded can be used. In this drying method, a heating member having a roll shape or a board shape or a wind, which is heated to the same temperature as that of the substrate, may be used in order to accelerate the evaporation of the solvent.

A drying temperature (heating temperature) is not particularly limited as long as said temperature is lower than the starting temperature of imidizing reaction mentioned below, and the solvent can be evaporated at said temperature. For example, the drying temperature may be within the same range as that used in the casting method.

In the extrusion molding method, a drying process for forming the sheet may be performed until the content of the solvent contained in the dried sheet becomes a value within the above-mentioned range.

In the extrusion molding method, the substrate preferably has a surface which contacts with the polyimide precursor gel, said surface being subjected to a mirror finish process. Usually the substrate having a surface roughness (Rz) of 10 to 500 nm is employed.

Processing Step of Annular Belt

Both ends of a sheet are joined to form an annular belt. A shape of the annular belt obtained is almost same as that of a desired annular belt. Specifically, as shown in FIG. 1, both ends (10*x*, 10*y*) of a sheet 1 having a square shape are joined to form an annular, especially tubular belt. The joining of the both ends of the sheet means that the both ends (10*x*, 10*y*) of the sheet 1 are joined continuously in an axial direction (AD) of a ring within the same plane without an occurrence of a difference in level on the joined portion. The joining process may be achieved by using a joining means such as a heat-resistant tape or by performing a joining treatment. Specifically, the joining of the both ends (10*x*, 10*y*) of the sheet may be achieved by a tape-fixing method in which the both ends of the sheet are fixed with a heat-resistant tape in a state where edge faces of the both ends are contacted each other or by a heat-melting method in which the both ends of the sheet are heated and pressed in a state where they are overlapped in a direction of thickness in order to flatten the both ends.

Figure 2:
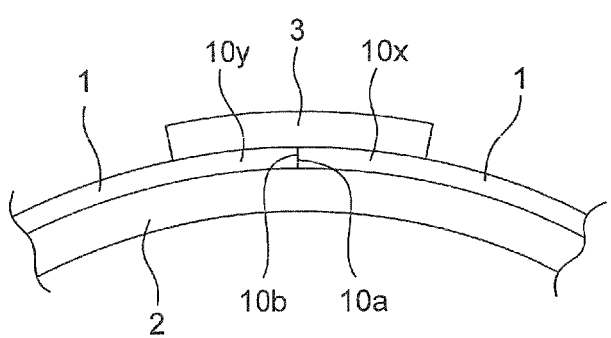
FIG. 2 is a schematic enlarged sectional view which explains one example of a method for joining both ends of a sheet.

In the tape-fixing method, as shown in FIG. 2, a sheet 1 is wound around a drum 2, and the both ends (10*x*, 10*y*) of the sheet 1 are fixed on the drum 2 by using a heat-resistant tape 3 in a state where edge faces (10*a*, 10*b*) of the both ends are contacted each other, so that neither a difference in level nor a gap occurs in the joined portion of the both ends (10*x*, 10*y*). Before being fixed by using the heat-resistant tape, a preliminarily heated trowel is preferably pressed to the joined portion in order to achieve a temporal joining. The drum preferably has a surface which contacts with the sheet, said surface being subjected to a mirror finish process. The drum normally has an outer peripheral surface having a surface roughness (Rz) of 10 to 3000 nm. It is sufficient for the heat-resistant tape 3 to retain the heat-resistance that keeps its fixability during an imidizing step which will be mentioned below. As the heat-resistance tape, a grass tape, a refractory mica tape, an adhesive tape made of acetate cloth and the like can be used. Such a heat-resistant tape is commercially available and examples thereof include a NITTO DENKO No. 5 (made by NITTO DENKO CORPORATION), a heat-resistant glass adhesive tape (made by 3M) and a refractory mica tape (made by OKABE MICA CO., LTD).

The surface roughness is the value measured by using a surface roughness tester (SJ-400; made by Mitsutoyo Corporation).

Figure 3:
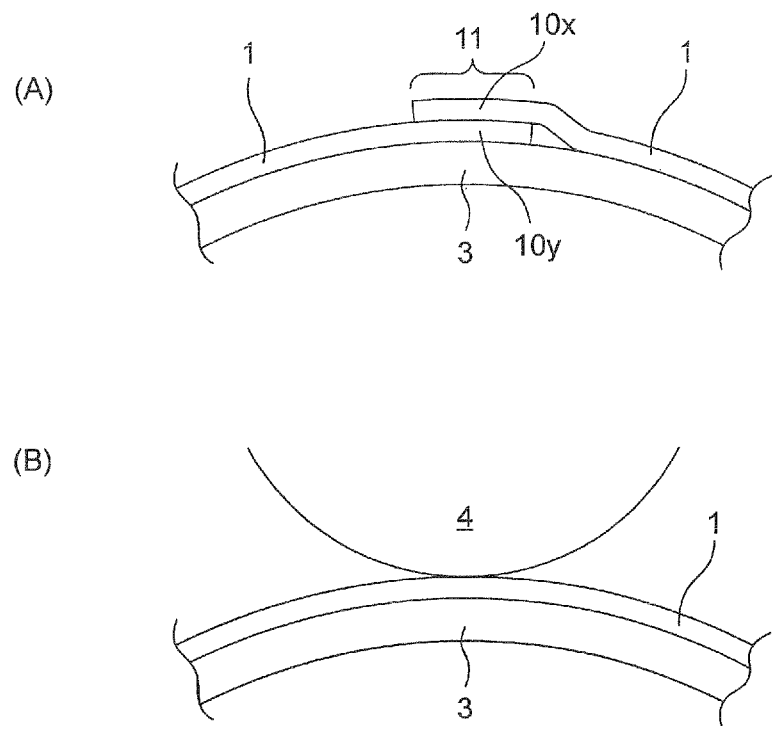
FIGS. 3 (A) and (B) are schematic enlarged sectional views which explain another example of a method for joining both ends of a sheet.

In the heat-melting method, as shown in FIG. 3 (A), a sheet 1 is wound around a drum 3 so that an overlapped portion 11 is formed at both ends (10*x*, 10*y*). Thereafter, as shown in FIG. 3 (B), a heated press roller 4 is pressed to the sheet and the overlapped portion 11 of the sheet is made to pass between the rotating drum 3 and press roller 4 so that the overlapped portion 11 is flattened by melting and pressing. Thereby, an interface between the both ends in the overlapped portion 11 disappears to integrate the both ends. As the drum 3, the same drum as the drum 2 used in the tape-fixing method can be used. The press roller 4 preferably has an outer peripheral surface which has been subjected to a mirror finish process. The press roller 4 normally has an outer peripheral surface having a surface roughness (Rz) of 5 to 500 nm. A heating temperature of the press roller 4 is a temperature at which the sheet can be melted without an occurrence of imidizing reaction and, for example, may be within the range of from 40 to 270° C., preferably 80 to 220° C. The drum 3 may be used after it is heated to such a temperature. A pressure of the press roller is not particularly limited as long as the object of the present invention is achieved and, for example, may be within the range of from 0.1 to 2000 MPa, preferably 0.1 to 500 MPa.

Imidizing Reaction Step

After the annular belt is formed, an imidizing reaction is performed. A polyamic acid forming the sheet becomes to polyimide due to the imidizing process. Sufficient uniformities with respect to physical properties such as a film thickness, an electrical conductivity and a surface roughness can be achieved in an annular belt, and the annular belt exhibits effectively a heat-resistance property and a stiffness property, that are the inherent properties of polyamide. In particular even when the both ends of the sheet are only fixed in a state where edge faces thereof are contacted each other according to the above-mentioned tape-fixing method, the interface between the edge faces disappears due to the imidizing process to integrate the both ends, so that a desired stiffness property, in particular, a desired tensile strength for the annular belt can be obtained.

The imidizing reaction is achieved by heating the annular belt to the prescribed temperature and keeping the annular belt at said temperature for the predetermined time. Said temperature is a starting temperature of imidizing reaction and is normally within the range of 280° C. or more, in particular 280 to 400° C., preferably 300 to 380° C., more preferably 330 to 380° C. The reaction time is normally within the range of 10 minutes or more, preferably 30 to 240 minutes.

The annular belt made of polyimide produced by using the above-mentioned method is particularly useful as a belt for electrophotography such as a transfer belt, a fixing belt and the like.

For example, when the annular belt made of polyimide is used as a transfer belt, a conductive agent, in particular carbon black, is normally added to the solution of the polyimide precursor, so that the carbon black is dispersed in the belt. Such a annular belt normally has a surface resistance of $1 \times 10^8$ to $1 \times 10^{12} \Omega/\square$, preferably $1 \times 10^9$ to $9 \times 10^{11} \Omega/\square$.

EXAMPLES

Example 1

Equivalent amounts of pyromellitic dianhydride and 4,4'-diaminodiphenyl ether were subjected to a condensation polymerization reaction in N-methylpyrrolidone (NMP) at ordinary temperature (20° C.) to obtain a solution of polyamic acid (A) (a solid content concentration: 18 wt %). A part of the solution (A) (200 g) was taken out, a No. 0 Solvent (made by JX Nippon Oil & Energy Corporation) (2 g) was added to the solution, and the mixture was sufficiently agitated to obtain a coating fluid. A solvent content in the coating fluid was 82.1 wt %. A sheet was continuously produced from the coating fluid by means of a flow casting method. More specifically, while a drum made of metal (whose surface was subjected to a mirror finish treatment; a surface roughness: 400 nm) having a width of 440 mm and a diameter of 400 mm, which was heated to 140° C., was rotated, the coating fluid was casted and coated on the outer peripheral surface of the drum by using an extrusion coater in order to dry the coated film. Then, a peeling of the dried film was performed to obtain a sheet made of polyamic acid (B) having a width of 400 mm, a length of 1210 mm and a thickness of 120 μm. A content of the solvent contained in the sheet was 6.2 wt %. A number average molecular weight of the polyamic acid forming the sheet was 15,000.

A sheet having a width of 320 mm and a length of 970 mm was cut out from the sheet made of polyamic acid (B), and the both ends of the obtained sheet were joined (processing step of the annular belt). Specifically, the obtained sheet (B) was wound around a drum made of metal (whose surface was subjected to a mirror finish treatment; a surface roughness: 400 nm) having a width of 400 mm and a diameter of 307 mm, and the overlapped part of the sheet was cut off. As shown in FIG. 2, edge faces (10a, 10b) of the both ends of the sheet 1 were made to contact each other on the drum 2 in such a way that a difference in level and a gap between the both ends were not generated in the joint part of the both ends. In such a state, a trowel (a trowel with a flat surface having an area of 1 cm² and a surface roughness of 400 nm) heated to a temperature of 150° C. was pressed on the contacted edge surfaces to joint said edge surfaces, and then visually confirmed that air bubbles were not contained in the jointed part. Thereafter, the jointed part was fixed by means of a heat-resistant tape 3 (heat-resistant glass adhesive tape; made by 3M).

After that, imidizing reaction was performed (imidizing step). Specifically, the drum around which the sheet was wound was put in a circulating hot air oven, the temperature of the oven was risen at a speed of 5° C./min from the room temperature to 350° C., and the temperature of 350° C. was maintained for 1 hour. The drum was removed from the oven, and a belt was removed from the drum to obtain an annular belt. The annular belt had a width of 389 mm, a peripheral length of 964 mm and a film thickness of 94 μm.

Example 2

An annular belt was produced according to the same method as that described in Example 1 except that i) the coating fluid obtained by the following method was used, and ii) a content of the solvent contained in the sheet shown in Table 1 was achieved by adjusting drying conditions.

Fifty grams of carbon (Printex U) were dispersed in NMP (450 g) by means of a homogenizer and an ultrasonic dispersing apparatus to prepare a carbon dispersion. The carbon dispersion (250 g) was added to the same solution of polyamic acid (A) (a solid content concentration: 18 wt %) (200 g) as that described in Example 1, and the mixture was agitated for 15 minutes by means of a homogenizer. No. 0 Solvent (made by JX Nippon Oil & Energy Corporation) (2 g) was added to the prepared mixture, and the mixture obtained was agitated for 10 minutes by means of a homogenizer to obtain a coating fluid. A content of the solvent in the coating fluid was 86.5 wt %.

Example 3

An annular belt was produced according to the same method as that described in Example 1 except that i) a content of the solvent contained in the sheet shown in Table 1 was achieved by adjusting drying conditions, and ii) the processing step of the annular belt was carried out by the following method.

A sheet having a width of 320 mm and a length of 970 mm was cut out from the sheet made of polyamic acid sheet (B), and the both ends of the obtained sheet were joined (processing step of annular belt). Specifically, the sheet made of polyamic acid (B) which was cut off was wound around a drum 3 made of metal (whose surface was subjected to a mirror finish treatment; a surface roughness (Rz): 250 nm) having a width of 400 mm and a diameter of 307 mm in such a way that an overlapped part of the both ends was formed as shown in FIG. 3 (A). After that, as shown in FIG. 3 (B), a press roller 4 (whose surface was subjected to a mirror finish treatment; a surface roughness (Rz): 100 nm), which was heated to 200° C., was then pressed to the sheet, and the sheet 1 was made to pass between the rotating drum 3 and press roller 4 to flatten the overlapped part 11. The pressure caused by the press roller 4 was 1 kg/cm$^2$.

Example 4

An annular belt was produced according to the same method as that described in Example 1 except that 1) a content of the solvent contained in the sheet shown in Table 1 was achieved by adjusting drying conditions, and ii) the processing step of the annular belt was carried out by the following method.

A sheet having a width of 320 mm and a length of 970 mm was cut out from the sheet made of polyamic acid (B), and the both ends of the obtained sheet were joined (processing step of annular belt). Specifically, the sheet made of polyamic acid (B) which was cut off was wound around a drum 3 made of metal (whose surface was subjected to a mirror finish treatment; a surface roughness (Rz): 250 nm) having a width of 400 mm and a diameter of 307 mm in such a way that an overlapped part of the both ends was formed as shown in FIG. 3 (A). After that, as shown in FIG. 3 (B), a press roller 4 (whose surface was subjected to a mirror finish treatment; a surface roughness (Rz): 100 nm) which was heated to 250° C., was then pressed to the sheet, and the sheet 1 was made to pass between the rotating drum 3 and press roller 4 to flatten the overlapped part 11. The pressure caused by the press roller 4 was 1 kg/cm$^2$.

Example 5

An annular belt was produced according to the same method as that described in Example 1 except that i) a content of the solvent contained in the sheet shown in Table 1 was achieved by adjusting drying conditions, and ii) the processing step of the annular belt was carried out by the following method.

A sheet having a width of 320 mm and a length of 970 mm was cut out from the sheet made of polyamic acid (B), and the both ends of the obtained sheet were joined (processing step of annular belt). Specifically, the sheet made of polyamic acid (B) which was cut off was wound around a drum 3 made of metal (whose surface was subjected to a mirror finish treatment; a surface roughness (Rz): 250 nm) having a width of 400 mm and a diameter of 307 mm in such a way that an overlapped part of the both ends was formed as shown in FIG. 3 (A). After that, as shown in FIG. 3 (B), a press roller 4 (whose surface was subjected to a mirror finish treatment; a surface roughness (Rz): 100 nm), which was heated to 230° C., was then pressed to the sheet, and the sheet 1 was made to pass between the rotating drum 3 and press roller 4 to flatten the overlapped part 11. The pressure caused by the press roller 4 was 1 kg/cm$^2$.

Example 6

An annular belt was produced according to the same method as that described in Example 1 except that i) the coating fluid obtained by the following method was used, and ii) a content of the solvent contained in the sheet shown in Table 1 was achieved by adjusting drying conditions.

Carbon (Nippon Graphite Industries, ltd.; PAG) (18.6 g) was added to the same solution of polyamic acid (A) (a solid content concentration: 18 wt %) (200 g) as that described in Example 1, and the mixture was agitated for 1 hour by means of a homogenizer. No. 0 Solvent (made by JX Nippon Oil & Energy Corporation) (2 g) was added to the prepared mixture, and the mixture was agitated for 10 minutes by means of a homogenizer to obtain a coating fluid. A content of the solvent in the coating fluid was 75 wt %.

Example 7

An annular belt was produced according to the same method as that described in Example 1 except that 1) the coating fluid obtained by the following method was used, and ii) a content of the solvent contained in the sheet shown in Table 1 was achieved by adjusting drying conditions.

Carbon (Nippon Graphite Industries, ltd.; PAG) (7.4 g) was added to the same solution of polyamic acid (A) (a solid content concentration: 18 wt %) (200 g) as that described in Example 1, and the mixture was agitated for 1 hour by means of a homogenizer. No. 0 Solvent (made by JX Nippon Oil & Energy Corporation) (2 g) was added to the prepared mixture, and the mixture obtained was agitated for 10 minutes by means of a homogenizer to obtain a coating fluid. A content of the solvent in the coating fluid was 79 wt %.

Example 8

An annular belt was produced according to the same method as that described in Example 1 except that i) the coating fluid obtained by the following method was used, and ii) a content of the solvent contained in the sheet shown in Table 1 was achieved by adjusting drying conditions.

Carbon (Ketchen Black) (50 g) was dispersed in NMP (450 g) by means of a homogenizer and an ultrasonic dispersing apparatus to prepare a carbon dispersion. The carbon dispersion (36 g) was added to the same solution of polyamic acid (A) (a solid content concentration: 18 wt %) (200 g) as that described in Example 1, and the mixture was agitated for 15 minutes by means of a homogenizer. No. 0 Solvent (made by JX Nippon Oil & Energy Corporation) (2 g) was added to the prepared mixture, and the mixture obtained was agitated for 10 minutes by means of a homogenizer to obtain a coating fluid. A content of the solvent in the coating fluid was 83.3 wt %.

Comparative Example 1

Equivalent amounts of pyromellitic dianhydride and 4,4'-diaminodiphenyl ether were subjected to a condensation polymerization reaction in N-methylpyrrolidone (NMP) for 24 hours at ordinary temperature (20° C.) to obtain a solution of polyamic acid (A) (a solid content concentration: 18 wt %). A part of the solution (A) (200 g) was taken out, said solution was uniformly casted on a sheet made of stainless steel in a thickness of 200 μm, and the casted film was dried at 120° C. for 120 minutes. An imidization was then performed stepwise. Specifically, a polyimide film having a thickness of 100 μm was obtained by stepwisely carrying out the imidizing reaction at 150° C. for 30 minutes, 200° C. for 30 minutes, 250° C. for 60 minutes, 350° C. for 30 minutes and 420° C. for 30 minutes. The obtained polyimide film was cut into a sheet having a length of 530 mm and a width of 320 mm. A specially modified silicone (Sailex 100; made by Konishi Co., Ltd.), which is a one-component elastic adhesive, was applied to one end of the sheet (applied width: 20 mm), and the both ends of the sheet were overlapped each other. After that, a weight (1 kg) was placed on the jointed portion, and said portion was cured at ordinary temperature for 1 hour to obtain an annular belt.

Comparative Example 2

Carbon (Printex U) (18 parts by weight relative to 100 parts by weight of a resin component) was added to a polyimide varnish for heat-resistant coating (U varnish-S; made by UBE INDUSTRIES, LTD.) which comprises a polyimide varnish (Upilex S; made by Ube Industries, Ltd.) as a resin component and N-methylpyrrolidone as a solvent, and the mixture was sufficiently mixed by means of a mixer. The obtained film-forming stock solution was poured into a cylindrical mold made of stainless steel having a diameter of 168 mm and a height of 500 mm, and a centrifugal molding was performed while said solution was dried for 120 minutes by heated air having a temperature of 120° C. The cylindrical film was obtained in a semi-cured state by demolding, and said film was covered on an iron core, and then the temperature of said film was raised from 120° C. to 350° C. over 30 minutes to evaporate the solvent. The film was further heated at a temperature of 450° C. for 20 minutes to perform a complete curing in which a dehydration condensation of polyamic acid was carried out. The obtained carbon black dispersed polyimide film having a thickness of 80 μm was cut into a seamless annular belt having a length of 320 mm.

Evaluation

Film Thickness and its Deviation

A thickness of the annular belt was measured by means of an automatic film thickness meter equipped with a HS3412 (made by Ono Sokki Co. Ltd.) in a sensor part at intervals of 10 mm on the entire circumference in a circumferential direction in order to calculate an average value and a deviation of film thickness in the circumferential direction. The deviation of film thickness in the circumferential direction means a thickness variability in the circumferential direction and was represented as a value of "the maximum value/the minimum value" with respect to the measured values.

Electrical Conductivity and its Deviation

A surface resistivity of the annular belt was measured by means of a resistor (Hirester made by Mitsubishi Yuka Denshi Co. Ltd.) at intervals of 10 mm on the entire circumference in a circumferential direction in order to calculate an average value and a deviation of resistance in the circumferential direction. The deviation of resistance in the circumferential direction means a resistivity variability in the circumferential direction and was represented as a value of "the maximum value/the minimum value" with respect to the measured values. A voltage and a time for measuring the surface resistivity were 500 V and 10 seconds respectively.

Surface Roughness and its Deviation

A surface roughness of the annular belt was measured as a 10-point average roughness (Rz) by means of a surface roughness meter (made by Tokyo Seimitsu Co. Ltd.) at intervals of 10 mm on the entire circumference in a circumferential direction in order to calculate an average value and a deviation of roughness in the circumferential direction. The deviation of roughness in the circumferential direction means a roughness variability in the circumferential direction and was represented as a value of "the maximum value/the minimum value" with respect to the measured values.

Tensile Strength

Figure 4:
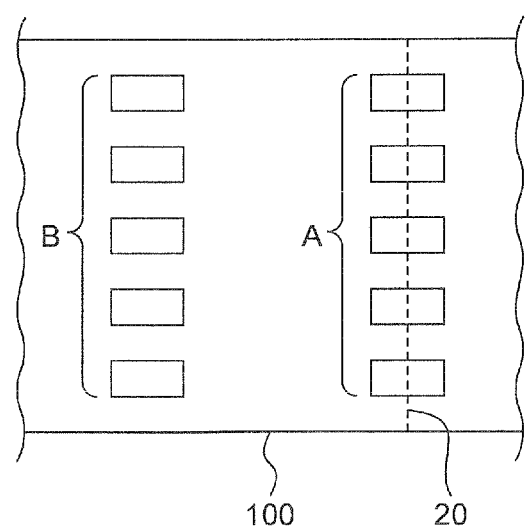
FIG. 4 is a schematic view of a part of an annular belt which explains an evaluation method.

As shown in FIG. 4, five specimens A were produced from the annular belt 100 in such a way that the jointed part 20 was arranged at the center part in each of the specimens. Five specimens B were produced from the annular belt 100 in such a way that each of the specimens did not contain the jointed part 20. The tensile strength was measured by using these specimens. With respect to each of the specimens A and B, an average value was calculated. The jointed part could be recognized by marking said part in a manufacturing process of the annular belt. In all of the specimens A produced from the annular belts which were obtained in Examples, breaks did not occur at the seams during testing.

Smoothness

The jointed part of the annular belt was visually observed under fluorescent lights. The meanings of the marks for evaluating the smoothness are as follows:

○: No streak was observed in the jointed part;

Δ: Minute streak was observed in the jointed part, but no problem occurred in practical use;

x: A difference in level was observed in the jointed part, and problems occurred in practical use; and –: The producing method was different from that of other examples, there was no jointed part in the belt.

The results of the above evaluations are shown in Table 1.

TABLE 1

| | Solvent Content of sheet* (wt %) | Tensile Strength* (MPa) | Film Thickness (μm) | | Surface Resistivity (Ω/□) | | Surface Roughness (nm) | | Tensile Strength (MPa) | | Smoothness |
|---|---|---|---|---|---|---|---|---|---|---|---|
| | | | Average Value | Deviation | Average Value | Deviation | Average Value | Deviation | Specimen A** | Specimen B*** | |
| Example 1 | 6.2 | 47 | 98 | 0.2 | — | — | 240 | 20 | 150 | 149 | ○ |
| Example 2 | 4.5 | 38 | 95 | 0.15 | $7 \times 10^{11}$ | 0.6 | 320 | 28 | 148 | 148 | ○ |
| Example 3 | 7.9 | 42 | 97 | 0.9 | — | — | 120 | 10 | 142 | 142 | Δ |
| Example 4 | 0.2 | 65 | 95 | 0.6 | — | — | 120 | 10 | 152 | 152 | Δ |
| Example 5 | 1.9 | 53 | 96 | 0.7 | — | — | 120 | 10 | 148 | 148 | ○ |
| Example 6 | 3.2 | 42 | 97 | 0.4 | 0.05 | 0.1 | 350 | 15 | 102 | 102 | Δ |
| Example 7 | 5.3 | 48 | 98 | 0.3 | 0.3 | 0.1 | 330 | 18 | 108 | 108 | ○ |
| Example 8 | 6.1 | 49 | 97 | 0.2 | $9 \times 10^{12}$ | 0.4 | 180 | 14 | 141 | 141 | Δ |
| Comparative Example 1 | — | — | 95 | 190 | — | — | 560 | 87 | 48 | 142 | X |
| Comparative Example 2 | — | — | 95 | 1.8 | $4 \times 10^{11}$ | 1.5 | 250 | 37 | 143 | 145 | — |

*Physical properties of the sheet made of polyamic acid.
**Specimen A contains a jointed part.
***Specimen B contains no jointed part.

When the annular belts prepared in Examples 1 to 8 are compared with those prepared in Comparative Examples 1 and 2, it is understood that an annular belt having i) a high uniformity with respect to a film thickness, an electrical conductivity and a surface roughness and ii) an excellent tensile strength and smoothness can be produced according to the present invention.

According to the present invention, the annular belt made of polyimide having sufficient uniformity regarding a film thickness, a surface roughness and the like can be produced in an excellent productivity.

What is claimed is:

1. A method for producing an annular belt made of polyimide comprising;
    a) forming a sheet having two ends made of a polyimide precursor;
    b) joining both ends of the sheet to form an annular belt; and
    c) performing an imidizing reaction of the polyimide precursor in the annular belt,
    wherein the joining of the both ends of the sheet made of the polyimide precursor is achieved by a heat-melting method in which the both ends of the sheet are heated and pressed in a state where they are overlapped in a direction of thickness in order to flatten the both ends.

2. The method for producing an annular belt made of polyimide according to claim 1, wherein the sheet made of the polyimide precursor is produced by a casting method or an extrusion molding method.

3. The method for producing an annular belt made of polyimide according to claim 2, wherein the casting method is i) a flow casting method in which a solution of the polyimide precursor is flow-casted on a substrate, and the solvent is evaporated or ii) a pour casting method in which a solution of the polyimide precursor is poured into a mold, and the solvent is evaporated.

4. The method for producing an annular belt made of polyimide according to claim 3, wherein the substrate and the mold have surfaces which contact with the solution of the polyimide precursor, said surfaces being subjected to a mirror finish process.

5. The method for producing an annular belt made of polyimide according to claim 3, wherein the solution of the polyimide precursor comprises a poor solvent.

6. The method for producing an annular belt made of polyimide according to claim 2, wherein the extrusion molding method is a method in which a gel of the polyimide precursor comprising a solvent is extruded from a T-die onto a substrate, and the solvent is evaporated.

7. The method for producing an annular belt made of polyimide according to claim 6, wherein the content of the solvent is within the range of from 8.0 wt % to less than 20 wt % relative to the total amount of the gel.

8. The method for producing an annular belt made of polyimide according to claim 6, wherein the substrate has a surface which contacts with the gel of the polyimide precursor, said surface being subjected to a mirror finish process.

9. The method for producing an annular belt made of polyimide according to claim 6, wherein the gel of the polyimide precursor is formed by drying the solution of the polyimide precursor, and said solution comprises a poor solvent.

10. The method for producing an annular belt made of polyimide according to claim 1, wherein the sheet made of the polyimide precursor comprises a carbon black, and the content of the carbon black is within the range of from 1 to 65 wt % relative to the amount of the polyimide precursor.

11. The method for producing an annular belt made of polyimide according to claim 1, wherein the sheet made of the polyimide precursor comprises a solvent, and the content of the solvent is within the range of from 0.1 wt % to less than 8.0 wt % relative to the total amount of the sheet.

12. The method for producing an annular belt made of polyimide according to claim 1, wherein the annular belt made of polyimide is used as a transfer belt or a fixing belt.

* * * * *